(12) United States Patent
Horr et al.

(10) Patent No.: US 7,750,980 B2
(45) Date of Patent: Jul. 6, 2010

(54) RECEPTION SYSTEM FOR MULTIPLE-TUNER TELEVISION ENABLING TO AUTOMATICALLY CONNECT EACH TUNER TO AT LEAST AN ANTENNA, WHATEVER THE NUMBER OF ANTENNAE IT COMPRISES

(75) Inventors: Olivier Horr, Rennes (FR); Denis Crespel, Gosné (FR); Serge Harzo, Mouazé (FR); Yves Richard, Saint Sulpice la Forêt (FR)

(73) Assignee: Thomson Licensing, Boulogne-Billacourt (FR)

( * ) Notice: Subject to any disclaimer, the term of this patent is extended or adjusted under 35 U.S.C. 154(b) by 1924 days.

(21) Appl. No.: 10/466,461

(22) PCT Filed: Jan. 10, 2002

(86) PCT No.: PCT/FR02/00094

§ 371 (c)(1),
(2), (4) Date: Dec. 10, 2003

(87) PCT Pub. No.: WO02/058381

PCT Pub. Date: Jul. 25, 2002

(65) Prior Publication Data
US 2004/0093617 A1 May 13, 2004

(30) Foreign Application Priority Data
Jan. 17, 2001 (FR) ................................ 01 00605

(51) Int. Cl.
*H04N 5/50* (2006.01)

(52) U.S. Cl. ..................................................... 348/731
(58) Field of Classification Search ................. 348/731, 348/730, 725, 565; 386/83; 455/3.02, 3.01, 455/3.03
See application file for complete search history.

(56) References Cited

U.S. PATENT DOCUMENTS

| 5,345,591 | A | | 9/1994 | Tsurumaki et al. | ........... 455/3.2 |
| 5,670,902 | A | * | 9/1997 | Nakagawa et al. | ............ 327/99 |
| 6,009,304 | A | * | 12/1999 | Kato | ............................ 725/68 |
| 6,011,594 | A | * | 1/2000 | Takashima | .................. 348/565 |
| 6,321,077 | B1 | * | 11/2001 | Saitoh et al. | ................ 455/345 |
| 6,650,376 | B1 | * | 11/2003 | Obitsu | ........................ 348/730 |

(Continued)

FOREIGN PATENT DOCUMENTS

EP           314931          5/1989

(Continued)

OTHER PUBLICATIONS

Search Report dated Apr. 17, 2002.

*Primary Examiner*—Paulos M Natnael
(74) *Attorney, Agent, or Firm*—Robert D. Shedd; Joseph J. Opalach; Brian J. Cromarty

(57) ABSTRACT

A system comprising a first converter linked to a first tuner and optionally, to a second tuner via switching means, optionally a second converter linked to the second tuner means for detecting whether the second converter is in service and means suitable for actuating the switching means in such a way as to link the second tuner to the second converter when one detects that the latter is in service and, in the converse case, to link it to the first converter.

3 Claims, 3 Drawing Sheets

U.S. PATENT DOCUMENTS

| | | | |
|---|---|---|---|
| 6,728,513 B1 * | 4/2004 | Nishina | 455/3.02 |
| 6,957,039 B2 * | 10/2005 | Imai | 455/3.02 |
| 7,034,898 B1 * | 4/2006 | Zahm et al. | 348/725 |
| 7,043,138 B1 * | 5/2006 | Wakahara et al. | 386/83 |

FOREIGN PATENT DOCUMENTS

| | | |
|---|---|---|
| EP | 1050920 | 11/2000 |
| EP | 1089469 | 4/2001 |

* cited by examiner

RECEPTION SYSTEM FOR MULTIPLE-TUNER TELEVISION ENABLING TO AUTOMATICALLY CONNECT EACH TUNER TO AT LEAST AN ANTENNA, WHATEVER THE NUMBER OF ANTENNAE IT COMPRISES

This application claims the benefit, under 35 U.S.C. §365 of International Application PCT/FR02/00094, filed Jan. 10, 2002, which was published in accordance with PCT Article 21(2) on Jul. 25, 2002 in French and which claims the benefit of French patent application No. 0100605, filed Jan. 17, 2001.

The invention relates to a reception system for television comprising at least two tuners each furnished with at least one input and one output, a first RF low signal noise converter linked at least to the first input of the first tuner, optionally at least one second RF low signal noise converter, and means for switching the input of the second tuner by choice over to the second converter or over to the first converter.

Such a system is generally used for the reception of television programs broadcast by satellite.

BACKGROUND OF THE INVENTION

In the case of satellite television, the converters are generally called "LNBs", the abbreviation standing for "Low Noise Block"; when the system comprises two converters, they are generally each placed at the center of a satellite antenna and thus there are two antennas: however, they may sometimes be placed at the center of the same satellite antenna, according to a so-called "twin LNB" configuration.

The document EP 0314931 (BRIONVEGA) describes a system comprising a plurality of converters and antennas, a single tuner ("satellite receiver" referenced 21), and means (referenced 29) for switching the input of this tuner by choice over to one or other of the plurality of converters (referenced 4, 7).

In the case of a system utilizing two converters and two tuners, the simplest configuration consists in connecting a converter to the first tuner and the other to the second tuner; according to a more complex configuration, the first converter provides a signal to be split on the one hand permanently to the first tuner and on the other hand optionally to the second tuner, according to the position of these switching means; such a system then generally comprises:

switching means exhibiting two possible positions, one for switching the input of the second tuner over to the second converter as in the simplest configuration, the other for switching the input of the second tuner over to the first converter, splitting means (the so-called "splitter") for splitting the signal delivered by the first converter to two outputs, one of which is permanently linked to the input of the first tuner, and the other of which is linked to the switching means; these splitting means are generally incorporated into the first tuner, so that this tuner then exhibits, in addition to the input for gathering the signal from the first converter, an output for duplicating this signal to another tuner.

A two-tuner system as described above may have the following applications:

it allows the viewer to watch a television program picked up by the first converter and the first tuner, while recording another television program processed by the second tuner; such an application is described in particular in patent application EP300193—THOMSON.

it allows the viewer to watch a main image of a television program arid to inlay a secondary image of another television program into this image; such an application is described in particular in patent application U.S. Pat. No. 5,557,338—THOMSON.

By virtue of the switching means of the system described hereinabove, the system can therefore be used, as described hereinabove, to receive two television programs simultaneously, whether these programs originate from two different transmitting sources via the two converters of the system, or whether these programs originate from the same transmitting source via just the first converter of the system:

in the first case of different sources, the switching means are actuated in such a way that the input of the second tuner is linked to the second converter, in the second case where the source is identical, the switching means are actuated in such a way that the input of the second tuner is linked to the first converter via splitting means as described hereinabove.

For applications of this type, it is then necessary to actuate the system switching means, depending on whether the two programs originate from the same source or from different sources.

To actuate the switching means, one merely needs to change the arrangements for plugging in the input of the second tuner.

To avoid this manual operation, it is also possible to provide switching means which can be actuated remotely, for example with the aid of a remote control; such switching means are described (and referenced 29) in the document EP 0314931 already cited and are actuated remotely by the keypad (referenced 23) of a remote control (see column 5, lines 3 to 6).

The intervention of an operator for the actuation of the switching means has drawbacks, related for example to the risk of a keying error or to the need, for the operator, to know whether the two programs are or are not broadcast by the same source.

The aim of the invention is to avoid these drawbacks.

Document U.S. Pat. No. 6,009,304 describes a system comprising two RF low signal noise converters suitable for delivering by choice a left polarized signal ("L") and/or a right polarized signal ("R"); each converter comprises a low noise amplifier ("LNA"), a bandpass filter ("BPF"), a mixer ("MIX") for converting the incoming signal into an intermediate frequency signal, and an intermediate frequency amplifier ("IF Amp"); between the mixer ("MIX") and the amplifier ("IF Amp"), the system comprises means ("S.W.") for switching the input of each amplifier ("IF Amp") by choice over to the output of the mixer of the first converter or/and over to the output of the mixer of the second converter; the system comprises means for driving the switching means as a function of the value of the voltages applied to the output of the converter (see claim 3+column 1, lines 40 to 60); unlike in the case of the reception systems described above, the state of the switching means is, at this juncture, independent of the state, in service or otherwise, of the converters; the system finally comprises means suitable for putting one or other of the converters out of service by removing the power supply to its intermediate frequency amplifier ("IF Amp"), when it is detected that the output of this amplifier is not loaded (claim 1); the output of an amplifier is considered not to be loaded when a voltage of 0 V or less than the voltage for driving the switching means is measured (column 5, lines 29 to 35).

According to this document, the same means of detection serve to drive switching means and means for placing out of service; the detection means are not suitable for detecting whether one or other of the converters is in service; thus, this document does not teach any solution of a kind as to avoid the aforesaid drawbacks.

BRIEF SUMMARY OF THE INVENTION

To avoid the aforesaid drawbacks, the subject of the invention is a reception system for television comprising a plurality of tuners each furnished with at least one input and one output, at least one RF low signal noise converter linked to an input of a tuner of said plurality, optionally at least one other RF low signal noise converter, and means for switching the input of at least one other tuner of said plurality by choice over to a converter which is not yet linked to a tuner of said plurality or over to a converter already linked to a tuner, characterized in that it comprises means for detecting whether the converter not yet linked is in service or is not in service, and means suitable for actuating said switching means in such a way as to link said input of this tuner to the not yet linked converter when said detection means detect that the latter is in service and to link said input of this tuner to the converter already linked to another tuner when said detection means detect that the converter not yet linked is not in service.

Other advantageous characteristics of the system according to the invention are defined in the dependent claims.

The subject of the invention is in particular a reception system for television comprising at least two tuners each furnished with at least one input and one output, a first RF low signal noise converter linked at least to the first input of the first tuner, optionally at least one second RF low signal noise converter, and means for switching the input of the second tuner by choice over to the second converter or over to the first converter characterized in that it comprises means for detecting whether the second converter is in service or is not in service, and means suitable for actuating said switching means in such a way as to link the input of the second tuner over to the second converter when one detects that the latter is in service and to link the input of the second tuner over to the first converter when one detects that this second converter is not in service.

The invention may also exhibit one or more of the following characteristics:
  the second converter being supplied with current when it is in service, the means for detecting whether the second converter is in service or is not in service rely on the detection of the current on the supply circuit of this second converter.
  the system also comprises a programmable microcontroller suitable for controlling the switching means incorporating software means adapted in such a way that the input of the second tuner is connected:
  to the second converter if the value of said current exceeds a predetermined threshold,
  to the first converter if the value of said current is less than or equal to said threshold.

The subject of the invention is also a process for television reception with the aid of at least two tuners each connectable to corresponding means of reception, which may be placed in service or out of service independently of one another, characterized in that it comprises the steps consisting in, for at least one of the tuners,
  detecting whether the means of reception corresponding to said tuner are in service, and,
  in the case where one detects that said means are in service, connecting said tuner to these means.
  in the case where one detects that said means are not in service, connecting said tuner to other means already connected to another tuner.

The invention may also exhibit the characteristic according to which, each of the means of detection requiring, when they are in service, a power supply producing a current greater than a predetermined threshold value, one detects whether the means of reception are in service by comparing the value of current produced by said power supply with said threshold value.

BRIEF DESCRIPTION OF THE SEVERAL VIEWS OF THE DRAWINGS

The invention will be better understood on reading the following description, given by way of non-limiting example, and with reference to the appended figures in which.

DETAILED DESCRIPTION OF THE INVENTION

Figure 1:
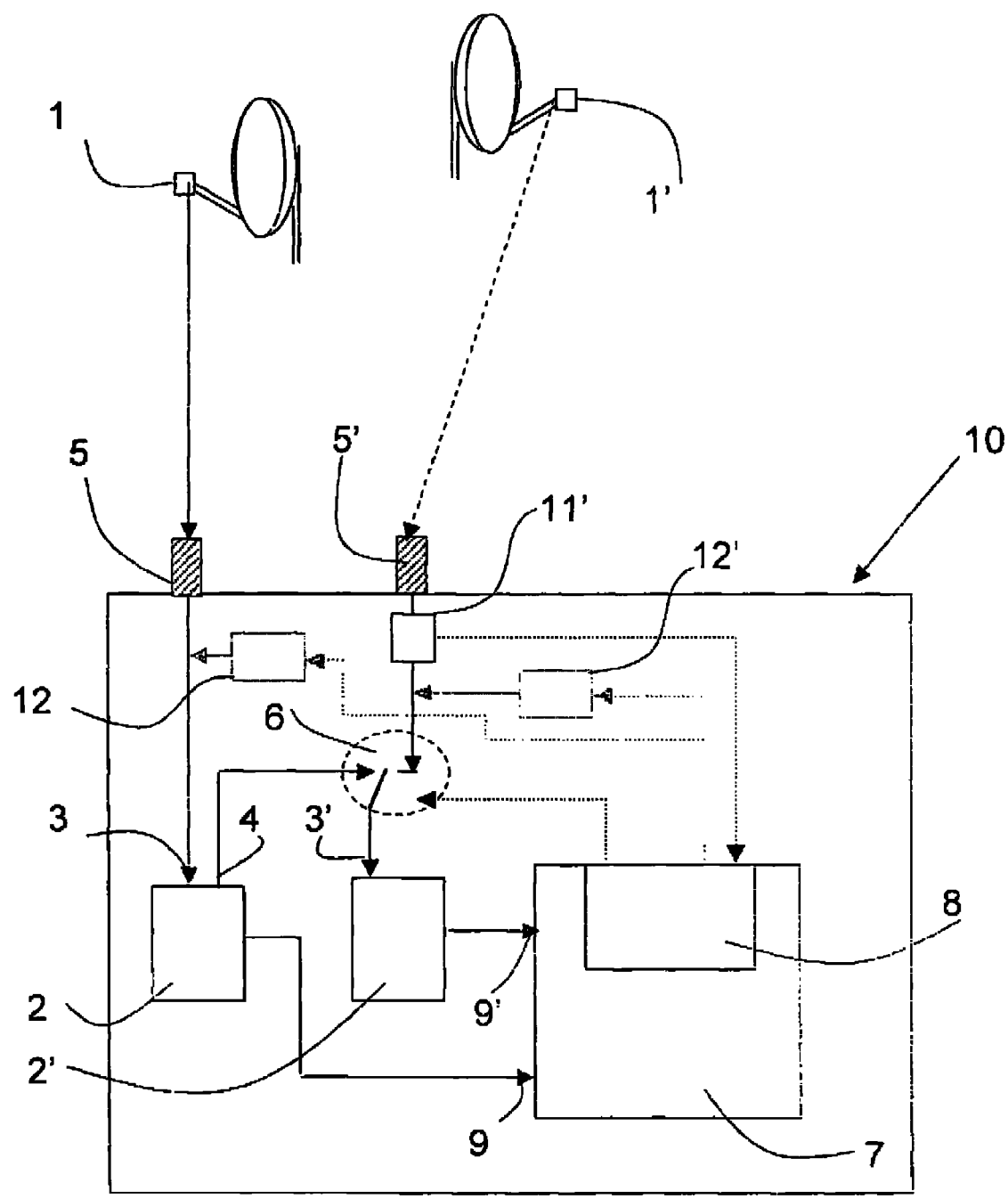
FIG. 1 illustrates a reception system for television according to a first embodiment of the invention.

Referring to FIG. 1, the reception system for television comprises a first satellite antenna furnished with a first low noise converter 1, optionally a second satellite antenna furnished with a second low noise converter 1', and a box 10.

The box 10 itself comprises:
  a first tuner 2 furnished with a so-called "demodulated" output and with an input 3 connected to the converter 1 via a socket 5 of the box: this first tuner here incorporates means (not represented) for splitting the input signal both toward the demodulation processing circuits specific to this tuner and toward a so-called "duplication" output 4,
  a second tuner 2' furnished with an input 3' and with a so-called "demodulated" output,
  means 6 for switching the input 3' of the second tuner 2' by choice over to the second converter 1' via another socket 5' of the box or over to the output 4 of the splitting means incorporated into the first tuner,
  means 7 of decoding the signals delivered by the tuners 2 and 2', driven by a microcontroller 8; these decoding means, known per se, will not be described in greater detail; they are conventionally furnished with inputs 9 and 9' each linked to the so-called "demodulated" output of the tuners 2. 2'; they are also furnished with outputs (not represented) linked for example to display means and/or to recording means,
  means 12 of control of the converter 1 which is plugged into the socket 5 of the box and means 12' of control of the converter 1' which is plugged optionally into the other socket 5' of the box; these means of control have two main functions:
    to supply power to each of the converters 1, 1',
    to determine, by way of the supply voltage level, the direction of polarization, right "R" or left "L", of the television signal to be received by the converter; such a function is described in detail in the document U.S. Pat. No. 6,009,304 already cited (see in particular column 1);
  These means of control 12, 12' are suitable for injecting the supply voltage for driving each converter 1, 1' between the socket of the box 5, 5' of this converter and, as the case may be, the switching means 6; thus plugged in upstream of the switching means 6, they are capable of powering this converter regardless of the state of these switching means. As illustrated in FIG. 1, these means of control 12, 12' may be driven by the microcontroller 8.

The radiofrequency signals from each converter 1, 1' are superimposed on the supply voltage for driving this converter.

According to the invention:

the switching means 6 are controllable remotely by the microcontroller 8, the box 10 furthermore comprises means of current detection 11' which are disposed on the supply circuit of the second converter 1', here between the means of control 12' and the socket 5', and which are suitable for delivering, to the microcontroller 8, data relating to the value 1' of this supply current, the microcontroller 8 incorporates software means for control of the switching means 6 adapted in such a way that the input 3' of the second tuner 2' is connected:

to the second converter 1' if the value of said current exceeds a predetermined threshold, to the output 4 of the splitting means incorporated into the first tuner 2, that is to say indirectly to the first converter 1 if the value of said current is less than or equal to said threshold.

Figure 2:
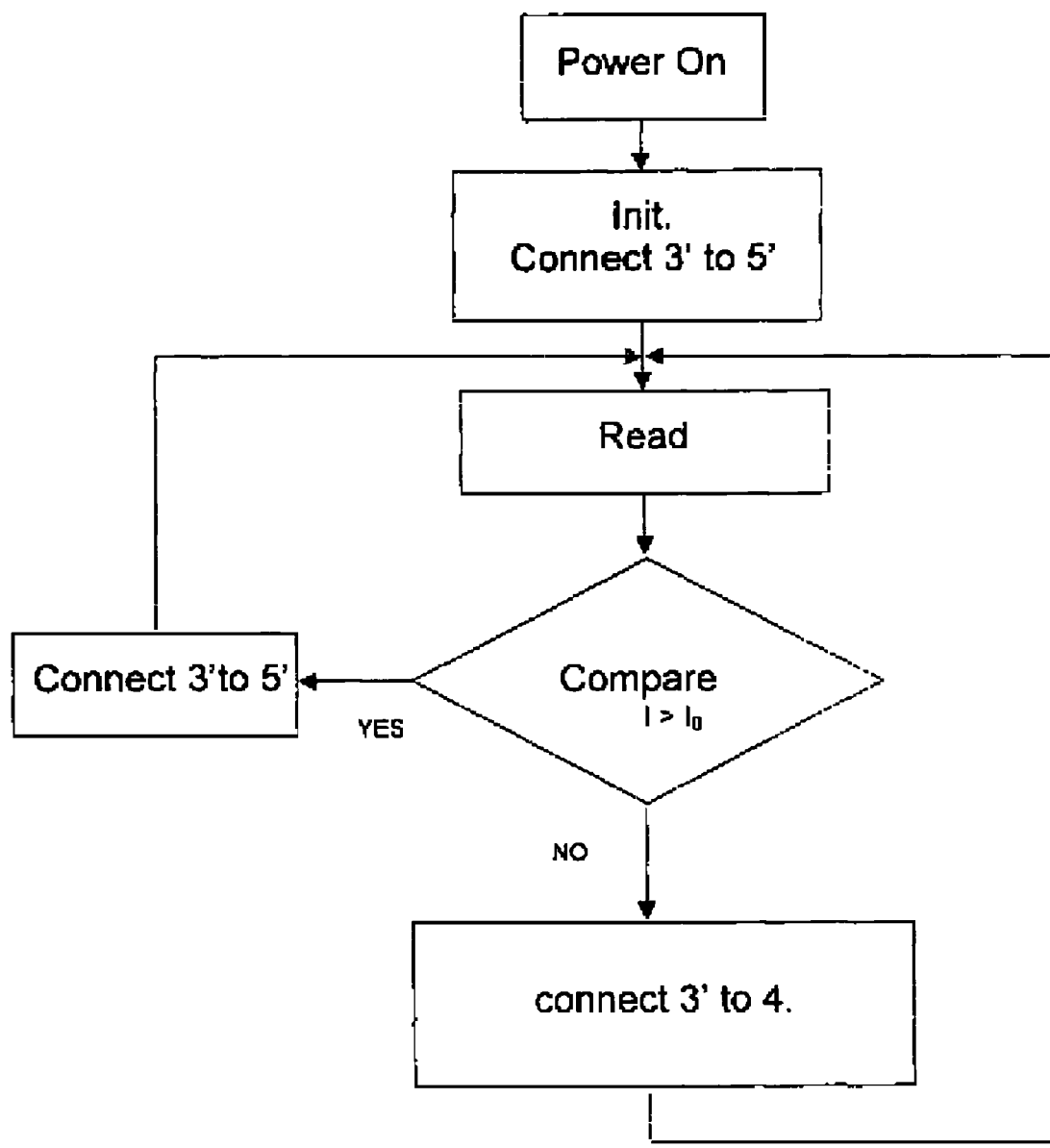
FIG. 2 illustrates an embodiment of software means able to drive the switching means of the system according to the invention as described in FIG. 1.

To implement the invention, these software means may for example be employed according to the logic chart of FIG. 2:

in the first step called "Power On", the microcontroller and the other components of the box 10 are powered up conventionally, and the means of control 12 of the converter 1 which is linked to the socket 5 are activated, in the second step called "Init", and the state of the switching means 6 is initialized in such a way that the socket 5' of the box is connected to the input 3' of the second tuner 2', in the third step called "Read", the means of control 12' of the converter 1' which is optionally linked to the socket 5' are activated and the data transmitted by the means of current detection 11 are gathered, in the fourth step called "compare", the value of current read I in the previous step is compared with a predetermined threshold value 10; for a conventional converter powered conventionally at 12.5 V or at 17 V depending on the polarity, vertical or horizontal, of the television signal to be received, the value of the supply current may reach the maximum value of around 350 mA; the predetermined threshold value is chosen for example to be around 10% of this maximum value, i.e. here $I_0$=35 mA approximately:

if $I>I_0$, then the fifth step consists in maintaining or in restoring the state of the switching means 6 in such a way that the socket 5' of the box is connected to the input 3' of the tuner 2';

if $I \leq I_0$, then the fifth step consists in establishing the state of the switching means 6 in such a way that the output 4 of the splitting means incorporated into the first tuner 1 is connected to the input 3' of the second tuner 2'; preferably, in this case, the means of control 12' are deactivated so as to limit energy consumption and to avoid any risk of short-circuiting at the level of the socket 5';

on completion of the fifth step, we loop back to the third step described above called "Read"; the looping rate can be adjusted in a manner known per se as a function of the desired rate of updating of the state of the switching means 6.

Thus, by virtue of the invention, the tuner 2' is:

either linked to the second converter 1' when one detects a supply current to this converter via the socket 5', that is to say when the second converter 1' is in service, that is to say is plugged into the socket 5' of the box 10, or linked to the first converter 1 via the tuner 2, when one does not detect any supply current via the socket 5', that is to say when the second converter 1' is not in service, that is to say is not plugged into this socket of the box 10.

Thus, by virtue of the invention, the two tuners are always operational and connected to a source without any intervention from the viewer being necessary any longer, whether just one or two sources are connected to the box 10; when just one source is connected via the socket 5, the two tuners are linked to this single source; when two sources are connected, each tuner is linked to a source.

According to a variant relating to the components of the box 10 the means for splitting the signal delivered by the first converter are external to the tuner 1; such means are called splitters.

Figure 3:
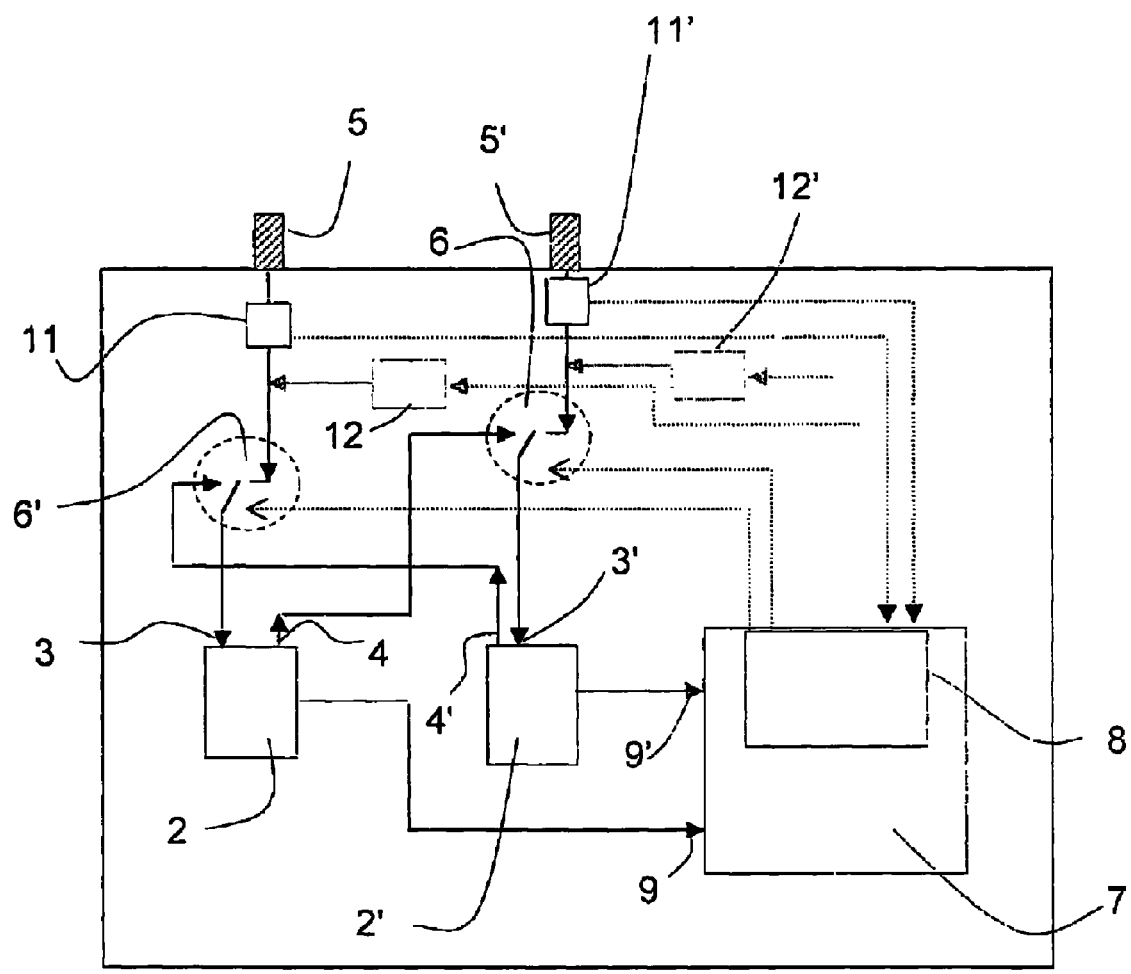
FIG. 3 illustrates a reception system for television according to a second embodiment of the invention.

According to another embodiment of the invention described in FIG. 3, where the system again comprises two tuners 2 and 2' here each furnished with a so-called "duplication" output 4, 4', in addition to the elements described hereinabove, the system comprises:

switching means 6' which make it possible to connect the input 3 of the first tuner 2 by choice to the first converter 1 via the socket 5 or to the second converter 1' via the socket 5'; the means of control 12 of the converter 1 are plugged in upstream of the switching means 6' so as to be able to power this converter regardless of the state of these switching means, means of detection of current 11 on the supply circuit of the first converter 1, which are positioned between the means of control 12 and the socket 5 of the box 10, and are suitable for delivering, to the microcontroller 8, data relating to the value I' of said current, the microcontroller 8 incorporates software means for control of the switching means 6' adapted in such a way that the input 3 of the first tuner 2 is connected:

to the first converter 1 if the value of said current I' exceeds a predetermined threshold, to the output 4' of splitting means incorporated into the second tuner 2', that is to say indirectly to the second converter 1', if the value of said current is less than or equal to said threshold.

The advantage of this variant is that, the system being perfectly symmetrical, when a single source or a single converter is connected to the box, one obtains the advantages of the invention regardless of which socket 5, 5' this converter is connected to.

The invention applies also to television reception systems comprising more than two tuners, for example n tuners; the box then comprises n input sockets connectable to an antenna, more precisely to a converter (since there may be several converters for the same antenna); inside the box, suitable switching means make it possible to link, by choice at least one of the tuners, or even each tuner, either to the socket corresponding thereto when the latter is connected to a converter and when this converter is in service, or, in the converse case, to another socket corresponding to another tuner from the moment that this socket is itself connected to an in-service converter, so that, by virtue of the invention, all the tuners of the box are connected permanently to in-service converters and can be used simultaneously for displaying or recording different television programs.

Thus, regardless of the number of antennas in the reception system—this number being less than or equal to the number of tuners—the system according to the invention makes it possible to automatically connect each of the tuners to at least one antenna, without requiring the intervention of an operator, without any risk of error of connection, and without needing to know whether various programs are or are not broadcast by the same source.

In the description hereinbelow, the detection of the placing in service or otherwise of a converter relies on the measurement of current, upstream of the means of control 12, 12', in the radiofrequency line linking the socket 5, 5' capable of being connected to this converter to the switching means 11, 11'; without departing from the invention, this same measurement of current can be incorporated into the means of control 12, 12' themselves.

Finally, without departing from the invention, means other than the measurement of current produced by the power supply to the converters may be used to detect whether a converter not yet linked is or is not in service.

The invention claimed is:

1. A reception system for television comprising:
   a plurality of tuners each furnished with at least one input and one output,
   a first RF low signal noise converter connected to an input of a first tuner of said plurality of tuners,
   a second RF low signal noise converter,
   means for switching the input of a second tuner of said plurality of tuners by choice over to the second converter or over to the first converter,
   means for detecting whether the second converter is in service or is not in service, and
   means suitable for actuating said switching means in such a way as to connect said input of the second tuner to the second converter when said detection means detect that the second converter is in service and to connect said input of the second tuner to the first converter when said detection means detect that the second converter is not in service.

2. The system as claimed in claim 1, wherein, the second converter being supplied with current when it is in service, the means for detecting whether this second converter is in service or is not in service rely on the detection of a current on the supply circuit of this second converter.

3. The system as claimed in claim 2, wherein it comprises a programmable microcontroller suitable for controlling the switching means incorporating software means adapted in such a way that the input of the second tuner is connected:
   to the second converter if the value of said detected current exceeds a predetermined threshold,
   to the first converter if the value of said detected current is less than or equal to said threshold.

* * * * *